April 22, 1941.　　　R. D. PULLEY　　　2,239,199
CASING MACHINE
Filed Oct. 6, 1936　　　5 Sheets-Sheet 1

INVENTOR
ROY D. PULLEY
BY
ATTORNEY

April 22, 1941.   R. D. PULLEY   2,239,199
CASING MACHINE
Filed Oct. 6, 1936   5 Sheets-Sheet 2

INVENTOR
Roy D. Pulley
BY
ATTORNEY

April 22, 1941.  R. D. PULLEY  2,239,199
CASING MACHINE
Filed Oct. 6, 1936   5 Sheets-Sheet 3

ATTEST:
Norbert E. Birch
Wm. C. Meiser

INVENTOR
ROY D. PULLEY
BY Tony W. Johns
ATTORNEY

April 22, 1941. R. D. PULLEY 2,239,199
CASING MACHINE
Filed Oct. 6, 1936 5 Sheets-Sheet 4

ATTEST -
Norbert E. Birch
Wm. C. Meiser

INVENTOR
Roy D. Pulley
BY
ATTORNEY

April 22, 1941.  R. D. PULLEY  2,239,199
CASING MACHINE
Filed Oct. 6, 1936  5 Sheets-Sheet 5

ATTEST -
Norbert E. Birch
Wm C. Meisen

INVENTOR
ROY D. PULLEY
BY
ATTORNEY

Patented Apr. 22, 1941

2,239,199

UNITED STATES PATENT OFFICE 2,239,199

CASING MACHINE

Roy D. Pulley, Chicago, Ill., assignor to Industrial Patents Corporation, Chicago, Ill., a corporation of Delaware Application October 6, 1936, Serial No. 104,279

5 Claims. (Cl. 17—43)

This invention relates to an improved casing cleaning device.

One of the objects of the invention is to provide an improved casing treating device for preparing sausage casings from animal intestines.

Another object of the invention is to provide an improved casing cleaning device which may be operated with a minimum of labor and which is exceptionally efficient for cleaning animal intestines.

Another object of the invention is to provide an improved method for the treatment and preparation of casings.

Other objects of the invention will be apparent from the description and claims which follow.

In preparing sausage casings from animal intestines, the intestines are first treated to remove the manure and food from the interior of the intestines and the untrimmed fat from the exterior of the intestines. The intestines are next turned inside out and are then further treated to crush and remove the slime from the outer surface of the turned intestines.

In accordance with the present invention, the several treatment steps incident to the cleaning of animal intestines are performed in sequence in a most efficient manner and with a minimum of labor.

In the drawings, similar reference characters are used to designate similar elements throughout the several figures.

The casing cleaning device, constructed in accordance with the present invention, comprises a series of machines for performing the several treatment steps incident to the cleaning of casings, which machines are, for the most part, operatively linked by conveyor belts for the mechanical conveyance of the casings therebetween.

Figure 1:
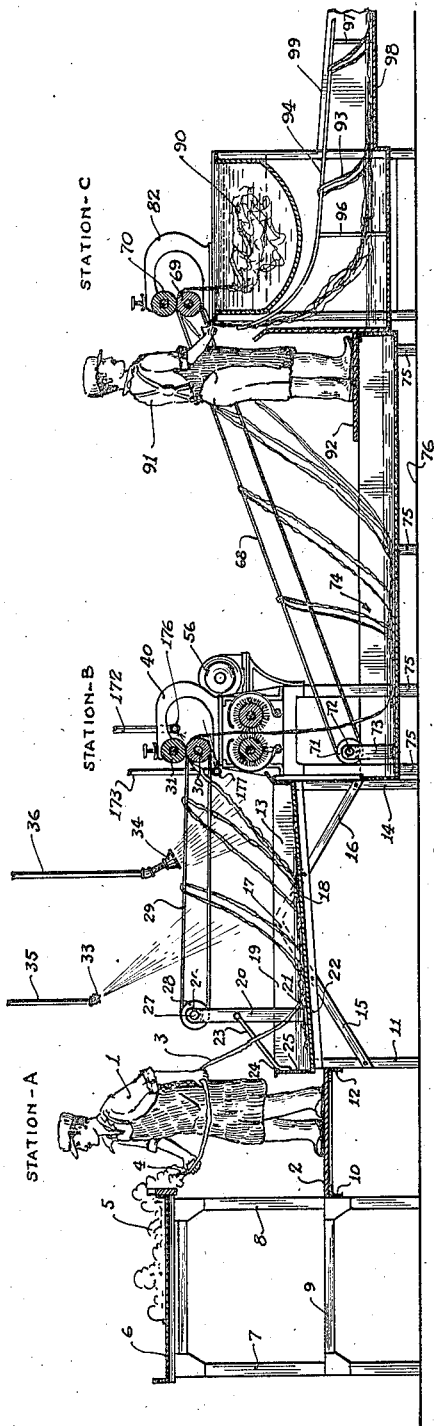
Figure 1 is a side view, partly in section, illustrating treatment Stations A, B and C of the casing treating device constructed in accordance with the present invention.
Figure 3:
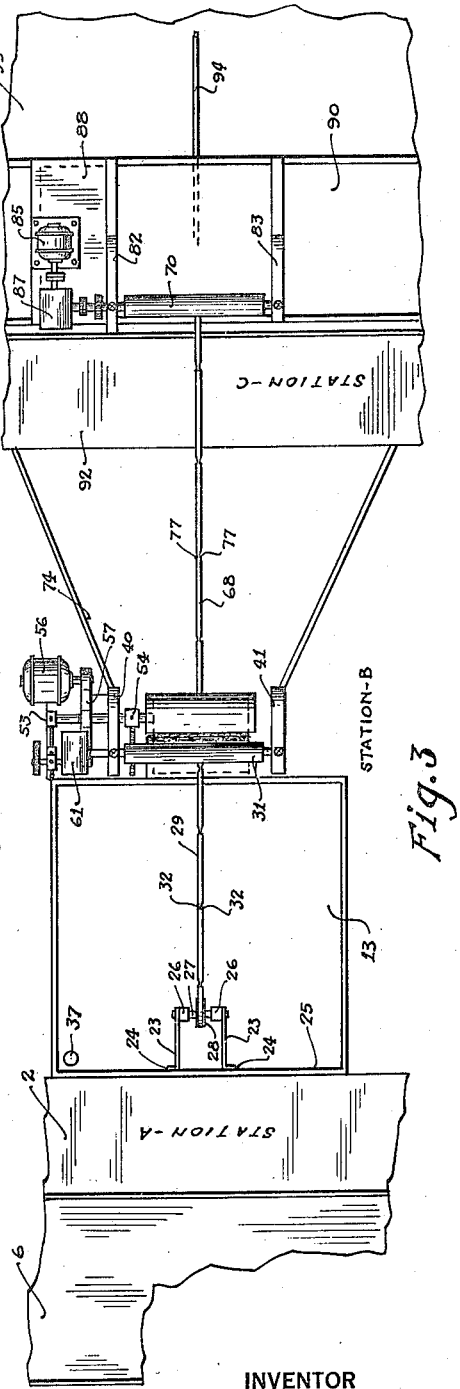
Figure 3 is a plan view of Figure 1.
Figure 2:
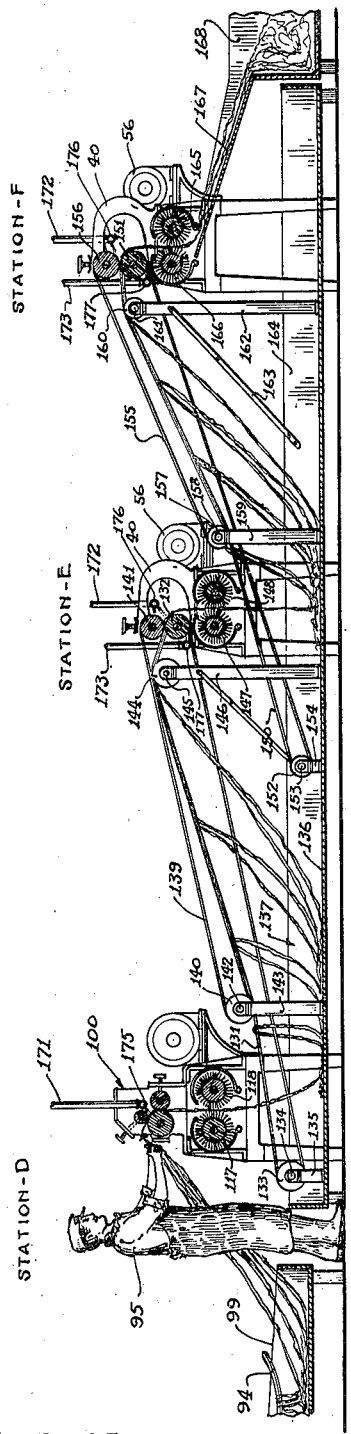
Figure 2 is a side view, partly in section of treatment Stations D, E and F of the casing treating device constructed in accordance with the present invention.
Figure 4:
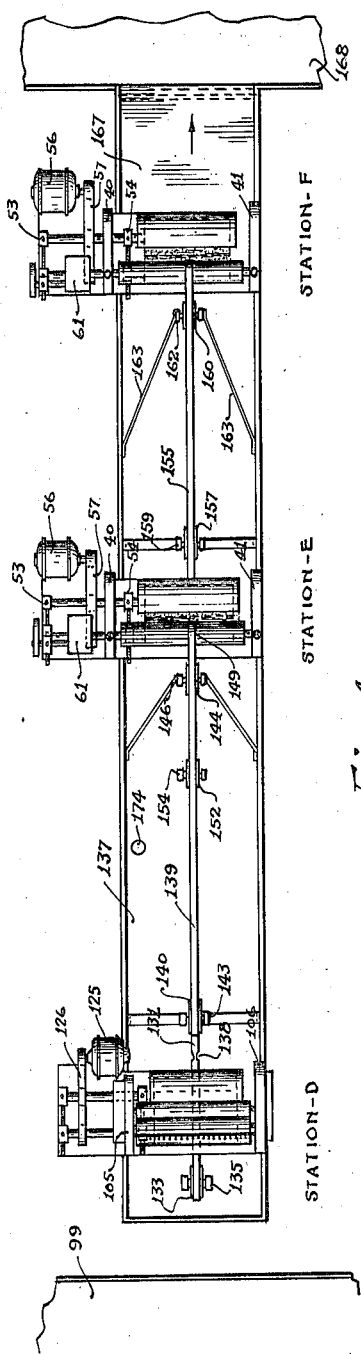
Figure 4 is a plan view of Figure 2.

In the embodiment of the invention illustrated in Figures 1 and 2, operator 1, stationed on platform 2, is shown severing casing 3 by means of knife 4 from the set of viscera 5 on table 6.

Table 6 is mounted upon uprights 7 and 8 braced by cross beams 9. Platform 2 is secured against uprights 8 by angle 10 and against uprights 11 by angle 12.

Tray 13 extends adjacent platform 2 and is supported at one end by uprights 11 and at its opposite end by uprights 14. Uprights 11 and 14 are rigidly braced by truss members 15 and 16 welded or otherwise secured against side walls 19 of tray 13, as at 17 and 18.

Risers 20 are secured, as at 21, to bottom 22 of tray 13 and are rigidly supported by truss members 23 secured, as at 24, against end wall 25 of tray 13. Risers 20 are provided at their free ends with suitable bearings 26, in which there is mounted shaft 27 for supporting pulley 28. Conveyor belt 29 travels over pulley 28 and roller 30 of opposed rollers 30 and 31, shown at treatment Station B. Conveyor belt 29 may be of the conventional straight edge type or, if desired, may be provided with a plurality of opposed gripping notches 32 for securely holding the casings for conveyance between rollers 30 and 31.

The casings traveling on conveyor belt 29 are exteriorily washed by water issuing from sprays 33 and 34 connected through lines 35 and 36 to a source of water supply not shown. The water issuing from sprays 33 and 34 is caught in tray 13, the bottom of which is sloped for draining toward drain plug 37. Tray 13 also serves to entrap the substances extruded from the ends of the casings by the squeezing action of rollers 30 and 31, which substances may be washed through drain 37 by the water issuing from sprays 33 and 34 to a catch trap, not shown.

In practice the operator, shown at Station A, loops each casing, as severed, at its approximate center and throws it across the upper flight of conveyor belt 29, whence it is automatically carried between rollers 30 and 31. The pressure between rollers 30 and 31 should be sufficient to press the bulk of the food and manure from the interior of the casings and to simultaneously strip the remnants of untrimmed fat from the exterior of the casings.

In the treatment of beef casings, which run approximately 100 feet in length, it is found that the casings may be more easily handled if separated into parts of approximately 50 feet in length. It has also been found practical to start the casings on their way between rollers 30 and 31 when only partially severed from the viscera, such that the first stripping of the casing will be substantially completed at the time the casing is completely run off from the viscera. When handling in this manner, the operator, after running off a sufficient length of the casing, loops the severed portion of the casing at its approximate center and throws it across conveyor belt 29, whence the casing will be started between rollers 30 and 31. The operator then continues to run off the balance of the casing while it is being carried between rollers 30 and 31.

Figure 6:
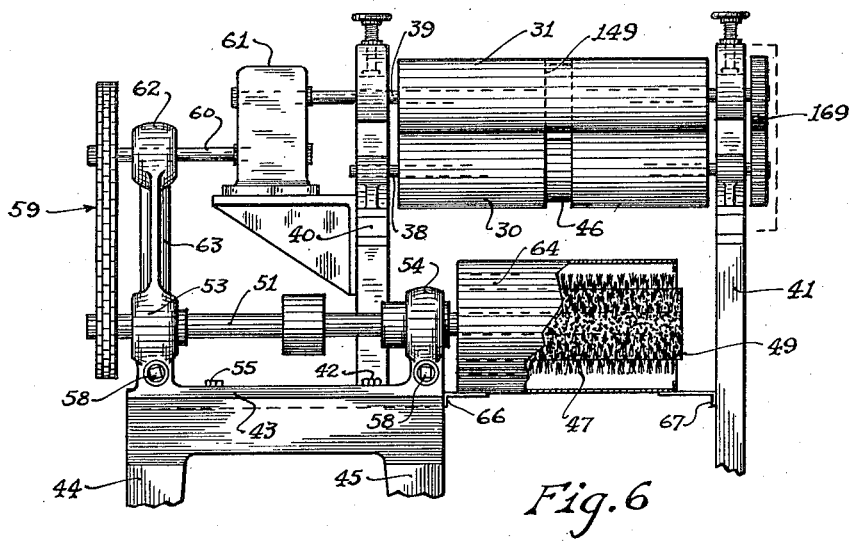
Figure 6 is a fragmentary front view, partly in section, of Figure 5.
Figure 5:
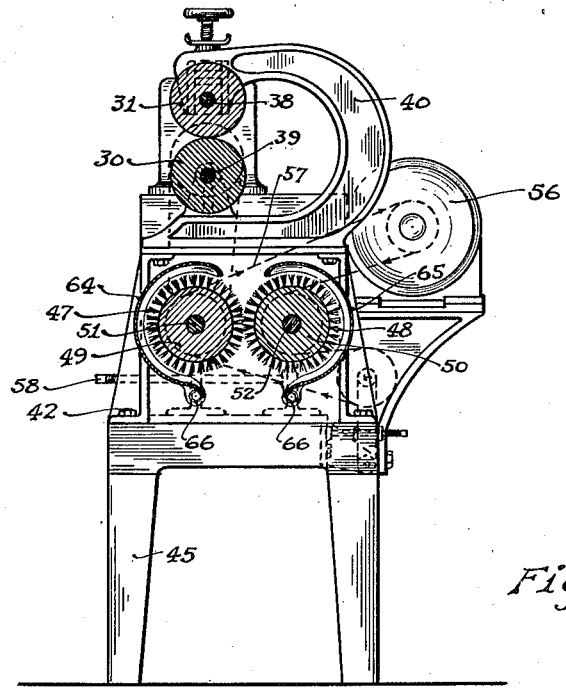
Figure 5 is a side view, partly in section, of one set of stripping and fatting rollers used in the casing cleaning device, at Stations B, E and F.

Reference is now had to Figures 5 and 6 in which the stripping rollers and fatting brushes utilized at treatment Station B are shown in detail.

Rollers 30 and 31 are preferably arranged one above the other upon shafts 38 and 39, which shafts 38 and 39 are rotatably mounted in suitable bearings in frame supports 40 and 41. Frame member 40 is shown bolted, as at 42, to platform 43. Platform 43 is mounted upon standards 44 and 45. Belt 29, as it travels over roller 30, is made to ride within peripheral recess 46, which recess is preferably of a depth equal to the thickness of belt 29, such that the rollers 30 and 31 will provide a squeezing surface throughout their length and thereby thoroughly strip the casings passing therebetween.

The casings, after passing from between rollers 30 and 31, will gravitate downwardly between rotatable fatting brushes 47 and 48. Brushes 47 and 48 are secured to the surfaces of oppositely disposed rollers 49 and 50, which rollers are arranged side by side with their opposing surfaces in substantially vertical alignment with the discharge surface of roller 30. Rollers 49 and 50 are secured to shafts 51 and 52, which shafts are journaled in suitable bearings mounted in spaced bearings 53 and 54 bolted, as at 55, to platform 43.

Shafts 51 and 52 are driven by power transmitted from motor 56 through the medium of belt 57, as shown most clearly in Figure 5. Shaft 39, carrying roller 31, is rotatably driven by power transmitted from shaft 51 through the medium of chain and sprocket mechanism 59, shaft 60 and speed reducer 61. Shaft 60 is supported in bearing 62 mounted in riser 63. Shaft 52 carrying roller 50 and brush 48 is provided with suitable take up mechanism 58 to compensate for wear on the brushes. Roller 30 is driven by shaft 39 through gears 169.

Rollers 30 and 31, through the agency of speed reduced 61, are geared to rotate at less R. P. M. than brushes 47 and 48, so that brushes 47 and 48 will sweepingly rotate against the casings fed from rollers 30 and 31 and thereby serve to more efficaciously remove the particles of crushed fat and the like from the outer surface of the casings.

Guard members 64 and 65 are provided about the outer surfaces of brushes 47 and 48 to entrap water, particles of fat and other material thrown off from the brushes by centrifugal force. Guard members 64 and 65 may be bolted or otherwise secured to standard 45, as at 66, and to frame 41, as at 67.

Casings passing from fatting brushes 47 and 48 will continue to fall by gravity, whence they will be picked up by conveyor belt 68 and carried between a pair of rollers 69 and 70, as shown at Station C. Conveyor belt 68 travels over roller 69 and pulley 71 and is driven by the roller 69. Pulley 71 is secured to shaft 72, which shaft is journaled in suitable bearings mounted in standards 73. Standards 73 may be suitably secured to the base of tray 74. Tray 74 is mounted upon uprights 75 and serves to hold the ends of the casings carried on belt 68 out of contact with flooring 76. Conveyor belt 68, like belt 29, may be provided with a plurality of opposed notches 77 for securing the casings thereon.

Figure 8:
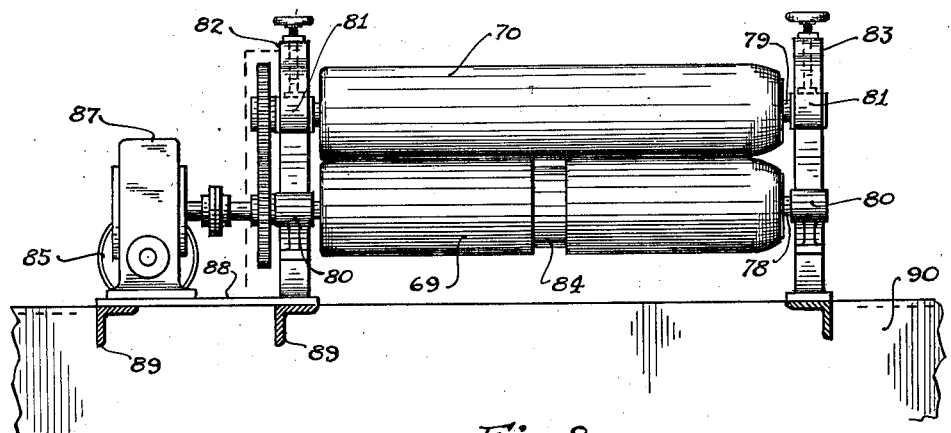
Figure 8 is a front view of Figure 7.
Figure 7:
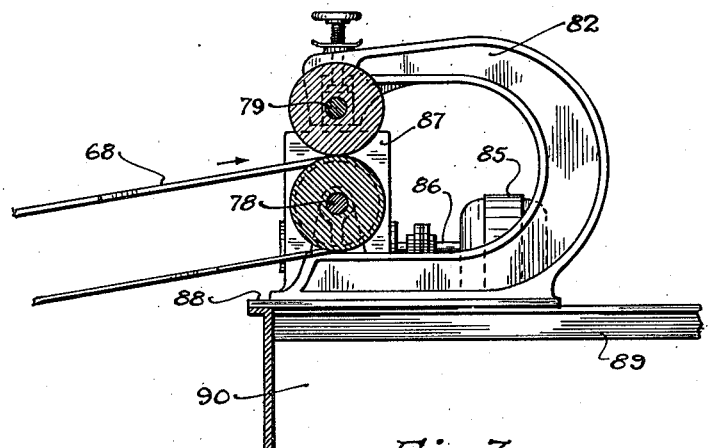
Figure 7 is a side view, partly in section, of another set of stripping rollers utilized in the casing cleaning device.

As shown in Figures 7 and 8, rollers 69 and 70 are arranged one above the other upon shafts 78 and 79, which shafts are journaled in bearings 80 and 81 mounted in frame members 82 and 83. Roller 69, like roller 30, is recessed, as at 84, to provide clearance for belt 68. Shaft 78 is driven by power transmitted from motor 85 through the medium of shaft 86 and speed reducer 87. Motor 85 and speed reducer 87 are suitably mounted upon platform 88 fixedly secured to frame member 82 rigidly braced by trusses 89 and mounted upon tank 90.

The casings passing from between rollers 69 and 70 will gravitate to rinsing tank 90, below roller 69. The casings, after rinsing, are individually removed from tank 90 by operator 91, stationed on platform 92 and are turned inside out so that their slime surfaces will be to the outside. The turned casings are looped at their approximate centers by the operator and are thrown, in the manner shown by casing 93, across inclined guide rail 94 for their gravity conveyance to operator 95, positioned at Station D. Guide rail 94 is rigidly supported by uprights 96 and 97 welded or otherwise secured to the base 98 of tray 99. At Station D the casings are removed from guide rail 94 by operator 95 and are fed one at a time within slime crusher and remover 100 for removal of the slime from their outer turned surfaces.

Figure 10:
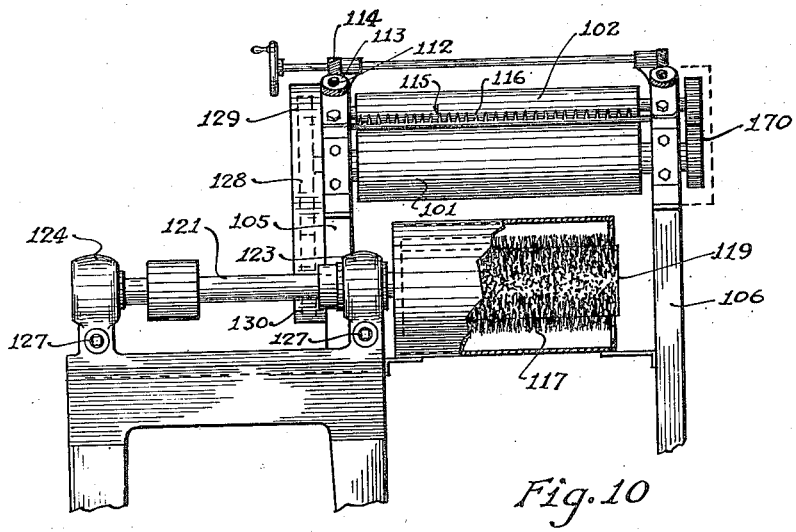
Figure 10 is a fragmentary front view, partly in section, of Figure 9.
Figure 9:
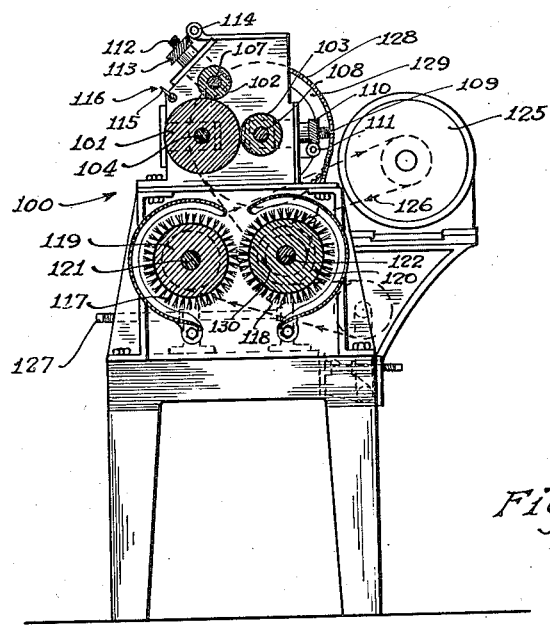
Figure 9 is a side view, partly in section, of the slime crushing machine utilized in the casing cleaning device at Station D.

As shown in Figures 9 and 10, the slime crushing mechanism 100 comprises roller 101 mounted in opposed relationship with rollers 102 and 103. Roller 101 is provided with a hard outer surface of metal or other suitable material and is secured to shaft 104, which shaft is journaled in suitable bearings mounted in frame members 105 and 106. Rollers 102 and 103 may also be provided with hard outer surfaces of metal or other suitable material and are respectively pinioned to shafts 107 and 108. Shafts 107 and 108 are preferably journaled in bearings slidably mounted in frame members 105 and 106 for movement from and toward shaft 104 to permit adjustment of rollers 102 and 103 against the surface of roller 101. The bearings of shaft 103 are each held in adjustment by means of a shaft 109 threaded for movement with its respective bearing, which shaft is provided with worm wheel 110 in mesh with worm 111. The bearings of shaft 107 are each held in adjustment by means of a shaft 112 threaded for movement with its respective bearing, which shaft is provided with worm wheel 113 in mesh with worm spindle 114.

Comb member 115, provided with teeth 116, extends parallel with the longitudinal surface of roller 101 and serves to guide and separate the casing strands as they are fed between rollers 101 and 102. Casings fed between rollers 101 and 102 will gravitate between rollers 101 and 103 and thence between rotatable brushes 117 and 118 mounted upon the surfaces of oppositely disposed rollers 119 and 120. Rollers 119 and 120 are secured to shafts 121 and 122, which shafts are journaled in suitable spaced bearings 123 and 124. Shafts 121 and 122 are driven by power transmitted from motor 125 through belt 126. Shaft 122 is provided with suitable take up mechanism 127 to compensate for wear on the brushes. Shaft 108 is driven from shaft 122 through the agency of chain 128 and gears 129 and 130. Shaft 108 drives shaft 104 through gears 170. Roller 102 is driven through contact with roller 101.

The pressure of rollers 102 and 103 against roller 101 serves to crush and loosen the slime on the outer surfaces of the casings passing therebetween, which slime is then removed by the action of brushes 117 and 118. Through use of proper gearing, brushes 117 and 118 rotate at greater R. P. M. than the relative feed of the casings from between rollers 101 and 103. Such an arrangement provides a sweeping movement of the brushes against the outer surfaces of the casings fed therebetween by which the crushed slime is effectively removed.

The casings passing from between brushes 117 and 118 gravitate to conveyor belt 131 traveling beneath brushes 117 and 118, whence they are automatically carried to Station E for a second slime crushing and removing operation.

Conveyor belt 131 travels over pulley 133 and stripping roller 132. Pulley 133 is pinioned to shaft 134, which shaft is journaled in suitable bearings mounted in uprights 135 welded or otherwise secured to base 136 of metal tray 137 provided with drain outlet 174. Conveyor belt 131 may be provided with gripping notches 138 similar to conveyor belt 29.

On account of the slimy outer surfaces of the casings traveling between Stations D and E, a belt 139, traveling over pulley 140 and stripping roller 141, is mounted in superposed contacting relationship with the upper flight of conveyor belt 131 to more firmly secure the casings carried on belt 131. Pulley 140 is pinioned to shaft 142, which shaft is journaled in suitable bearings mounted in uprights 143 welded or otherwise secured to base 136 of tray 137.

Tension is applied between belts 131 and 139 by means of roller 144, which roller serves to fixedly hold the upper flight of belt 131 in a raised position against the lower flight of belt 139. Roller 144 is pinioned to shaft 145, which shaft is journaled in suitable bearings mounted in uprights 146 welded or otherwise secured to base 136 of tray 137.

Rollers 132 and 141 serve to crush the bits of slime remaining on the outer surfaces of the casings after passing from Station D.

The casings, after passing from between rollers 132 and 141, will gravitate between rotatable brushes 147 and 148, whence the particles of slime crushed by rollers 132 and 141 will be removed therefrom.

The roller and brush mechanism utilized at Station E, is similar to the mechanism shown in Figures 5 and 6 for use at Station B, except that in the uppermost roller 141 there is also provided a peripheral recess 149 for the reception of belt 139, which recess is shown in dotted lines in Figure 6 of the drawings.

The casings passing from between brushes 147 and 148 gravitate to conveyor belt 150, whence they are carried to treatment Station F for further slime crushing and removing treatment. Treatment Station F may be eliminated from the device, if desired, but in practice it has been found effective for a more thorough cleaning of the slime surfaces of the casings.

Conveyor belt 150 travels over roller 151 and pulley 152 and may be provided with a plurality of gripping notches similar to belt 29. Pulley 152 is pinioned to shaft 153, which shaft is journaled in suitable bearings mounted in uprights 154 rigidly secured to base 136 of tray 137. A conveyor belt 155 is also mounted in superposed contacting relationship with belt 150 to prevent slippage of the casings carried on belt 150. Belt 155 travels over roller 156 and pulley 157. Pulley 157 is secured to shaft 158, which shaft is journaled in suitable bearings mounted in uprights 159 rigidly secured to base 136 of tray 137. Tension between belts 150 and 155 is suitably maintained by roller 160, which roller 160 serves to hold the upper flight of belt 150 in a raised position against belt 155. Roller 160 is pinioned to shaft 161, which shaft is journaled in suitable bearings mounted in uprights 162 rigidly secured to base 136 of tray 137. Brace rods 163 are extended between uprights 162 and side walls 164 of tray 137 to prevent vertical displacement of uprights 162.

At Station F the casings are passed between crushing rollers 151 and 156 and thence through rotatable brushes 165 and 166. In other words, the treatment given the casings at Station E is duplicated at Station F to further assure against any particles of slime or other matter remaining on the outer surfaces of the casings. Likewise, the mechanism utilized at Station F is similar in every respect to that utilized at Station E.

Casings passing from between rotatable brushes 165 and 166 will fall upon inclined chute 167, whence they will gravitate to vat 168. The casings emptying into vat 168 have been thoroughly cleaned and are ready for grading and drying.

Casings passing through rollers 101, 102 and 103 at Station D are flushed with water supplied by pipe 171 to spray means 175, which may be a perforated pipe arranged parallel with the rollers.

To prevent adherence of casings to the rollers and to keep the brushes wet at Stations B, E and F, water is supplied through pipes 172 and 173 to spray means or perforated pipes 176 and 177 respectively, by which water is constantly supplied to the working portions of the rollers and brushes at these stations.

For convenience, the operation of the apparatus is discussed in detail without specific reference to the drawings.

The apparatus of the present invention involves a sequence of machines linked by conveyor belts for the transfer of casings from one machine to another without manual labor. Beef rounds casings, which are approximately one hundred feet long, are run off the set of viscera by hand with a sharp knife, the casing being cut in two lengths approximately at the center. After the first twenty-five feet has been run off from the fat, the center of the length is thrown over a conveyor belt driven by the first machine in the sequence, the stripping machine. The casings gravitate from the stripping rollers of the stripping machine down between revolving rice root brushes. The balance of the half casing is then run off the set and by the time the half casing is removed from the fat, it is practically stripped, as the moving conveyor belt catches the center of the casing and draws it between the two rubber rollers of the stripping machine which removes all contents. The other half of the casing is run off in the same manner. As the center passes between the stripping rollers, it gravitates between two revolving rice root brushes driven at high speed, which removes the fat, the casing being held back by the stripping rollers. The center of the casing then drops on a conveyor belt placed immediately beneath the brushes. This belt conveys the casing and deposits it in the turning vat, at which point the casing is turned wrong side out by hand, and thrown over a somewhat slanting rod down which it slides to the end of the turning pan.

There, it is picked up by the operator and fed into the first sliming unit, which is called a slime breaker or slime crusher. This machine loosens the slime on the outside of the casing. As the center of the casing passes through the slime breaker, it gravitates between two revolving bristle brushes, which remove loosened slime.

After passing through these two brushes, the center falls upon another conveyor belt driven by another stripping machine which gravitates between two revolving bristle brushes which remove more slime.

The center of the casing then falls upon another conveyor which takes it through the same process, that is, a stripping machine and a set of revolving bristle brushes, which complete the sliming.

The center of the casing then falls into a chute or metal slide which gravitates it into a chilling vat preparatory to grading.

It will be noted that the present invention eliminates the manual labor incident to feeding casings into a stripping machine and the manual labor incident to feeding casings into a fatting machine. Furthermore, the present invention eliminates the manual labor of removing casings from a reel on a fatting machine, as is conventional practice, and delivers the casings to the turning vat. Consequently in the present invention the stripping and fatting processes are entirely automatic. The turning of the casings and feeding into the slime breaker is necessarily performed by hand, however, with this exception the sliming or cleaning of casings by the present invention is entirely automatic since the labor of feeding of machines and transferring of casings from one machine to another is eliminated.

The device of the present invention provides a most efficient and simple method for transferring the casings between the several mechanisms utilized in the several cleaning operations incident to the preparation of animal intestines for use as sausage casings.

It will be understood that changes may be made in the design of the several features of the invention, herein disclosed, without departing from the spirit of the invention as defined in the claims which follow.

I claim:

1. A casing treating apparatus comprising a frame, means at the forward end of said frame and at the rearward end of said frame for supporting endless conveying means, means at the rearward end of said frame for supporting a second endless conveying means, said first conveying means being in superposed relation relative to said second conveying means and casing treating means between said first conveying means and said second conveying means whereby a casing released by said first conveying means will drop by gravity to the treating means and following treatment will be gravitationally disposed onto said second conveying means.

2. A casing treating apparatus comprising a frame, means at the forward end of said frame and at the rearward end of said frame for supporting endless conveying means, means at the rearward end of said frame for supporting a second endless conveying means, said first conveying means being in superposed relation relative to said second conveying means and said second conveying means being inclined upwardly in the direction of its travel, casing treating means between said first conveying means and said second conveying means whereby a casing released by said first conveying means will drop by gravity to the treating means and following treatment will be gravitationally disposed onto said second conveying means, and a cleaning device disposed relative to the discharge end of said second conveying means whereby said casing may be transferred to said cleaning means upon discharge from said treating means.

3. A casing treating apparatus comprising a frame, means at the forward end of said frame and at the rearward end of said frame for supporting an endless conveying belt, means at the rearward end of said frame for supporting a second endless conveying belt, said first conveying belt being in superposed relation relative to said second conveying belt and each of said conveying belts being provided with notches in the sides adapted to securely hold casings for conveyance thereon, and casing treating means between said first conveying belt and said second belt whereby a casing released by said first conveying belt will drop by gravity to the treating means and following treatment will be gravitationally disposed on the said second conveying means.

4. A casing treating apparatus comprising a frame, means at the forward end of said frame and at the rearward end of said frame for supporting an endless conveying belt, means at the rearward end of said frame for supporting a second endless conveying belt, said first conveying belt being in superposed relation relative to said second conveying belt, said second conveying belt being inclined upwardly in the direction of its movement and each of said conveying belts being provided with notches in the sides adapted to securely hold casings for conveyance thereon, casing treating means between said first conveying belt and said second conveying belt whereby a casing released by said first conveying belt will drop by gravity to the treating means and following treatment will be gravitationally disposed onto said second conveying belt, and a cleaning device disposed relative to the discharge end of said second conveying belt whereby said casing may be transferred to said cleaning means upon discharge from said treating means.

5. A casing treating apparatus comprising a frame, means at the forward of said frame and at the rearward end of said frame for supporting an endless conveying belt, means at the rearward end of said frame for supporting a second endless conveying belt, said first conveying belt being in superposed relation relative to said second conveying belt, and each of said conveying belts being provided with notches in the sides adapted to securely hold casings for conveyance thereon, and casing treating means between said first conveying means and said conveying means, the receiving end of said second conveying belt being disposed in advance of said casing treating means, said conveying belts and casing treating means being cooperatively arranged whereby a casing released by said first conveying means will drop by gravity to the treating means and following treatment will be gravitationally disposed onto said second conveying means in engagement with said notches.

ROY D. PULLEY.